United States Patent [19]

Horsch

[11] Patent Number: 4,640,373
[45] Date of Patent: Feb. 3, 1987

[54] BORE HEAD FOR DEEP-HOLE BORING
[75] Inventor: Wilfried Horsch, Obrigheim, Fed. Rep. of Germany
[73] Assignee: GTE Products Corporation, Stamford, Conn.
[21] Appl. No.: 703,069
[22] Filed: Feb. 19, 1985
[30] Foreign Application Priority Data
Mar. 24, 1984 [DE] Fed. Rep. of Germany ....... 3410967
[51] Int. Cl.⁴ .............................................. E21B 7/28
[52] U.S. Cl. ..................................... 175/272; 175/286
[58] Field of Search ............... 175/252, 273, 286, 271, 175/270, 272, 292; 166/55, 55.1, 55.2, 55.3, 55.6, 55.7, 170, 297

[56] References Cited
U.S. PATENT DOCUMENTS

| | | | |
|---|---|---|---|
| 1,406,348 | 2/1922 | Corrigan | 175/272 X |
| 1,612,338 | 12/1926 | Wilson et al. | 175/273 X |
| 1,667,190 | 4/1928 | Campbell | 175/273 X |
| 1,788,633 | 1/1931 | Raymond | 175/273 |
| 1,993,948 | 3/1935 | Schroeder | 175/273 |

Primary Examiner—Stephen J. Novosad
Assistant Examiner—Matthew Smith
Attorney, Agent, or Firm—Robert E. Walter

[57] ABSTRACT

The present invention deals with a bore head for deep-hole boring, in which a plurality of circumferentially spaced cutting members may be radially displaced in the bore hole by a common actuating device during operation. The actuating device includes an actuating rod for each cutting member, which actuating rod is in engagement with its associated cutting member by gear means including inclined teeth. The actuating rods are secured to a central actuating bar by a common connecting member. The bore head is interchangeably secured to a boring tube, and the actuating rod may be separated from the connecting member by a coupling which is automatically engaged and disengaged during changing of the bore head.

1 Claim, 3 Drawing Figures

BORE HEAD FOR DEEP-HOLE BORING

DESCRIPTION

The present invention relates to a bore head for deep-hole boring, comprising a plurality of circumferentially spaced cutting members adjustable transverse to the bore head axis, and an actuating device actuatable by a drive motor for adjusting the cutting members.

Bore heads of this type are used for boring to increase the diameter of a bore in a workpiece. To this end, a bore head secured to a boring tube and supporting radially retracted cutting members is inserted into the bore of the workpiece, whereupon the cutting members are radially extended during the work stroke in the opposite axial direction. With the prior-art bore heads the actuating devices for radially displacing the cutting members are relatively complicated, and generally they are suited only for displacing one or two cutting members. There results relatively long work times. Furthermore, interchanging the bore head is generally troublesome and time-consuming since the actuating device must be separated and reconnected independently.

A primary object of the present invention is to provide a bore head allowing to adjust a greater number of cutting members during the cutting operation in a simple and effective manner. A further object of the invention is to allow for automatic release and reengagement of the actuating device during an interchange of the bore head.

To this end, a bore head of the above-identified type is characterized according to the present invention in that the actuating device comprises an actuating rod for each cutting member, each actuating rod being displaceable in a direction parallel to the bore head axis and acting on its associated cutting member by force transmitting means, and in that said actuating rods are connected to a central actuating bar being axially displaceable by a drive motor. Such structure allows for an arrangement and simultaneous adjustment of a greater number of cutting members, e.g. of five cutting members. Even though all the cutting members are adjusted by a common actuating bar, their adjusting strokes may be different from each other due to the use of individual actuating rods. The bore head according to the present invention is of simple structure and may be easily handled. Furthermore it allows to substantially reduce work times as compared to conventional bore heads.

According to a further aspect of the present invention the bore head is removably secured to a boring tube by screw means and the actuating bar is separable from the bore head by a coupling which is automatically engaged and disengaged during an interchange of the bore head. The coupling preferably comprises a plurality of balls, a coupling sleeve radially movably receiving said balls, a coupling rod adapted to be inserted into the coupling sleeve and included a ramp-like shoulder for the balls, and an outer sleeve holding the balls in the coupling sleeve. The result is that it is unnecessary to separately disassemble and reassemble the actuating device during an interchange of the bore head.

A preferred embodiment of the present invention will be described with reference the accompanying drawings, wherein.

Figure 1A:
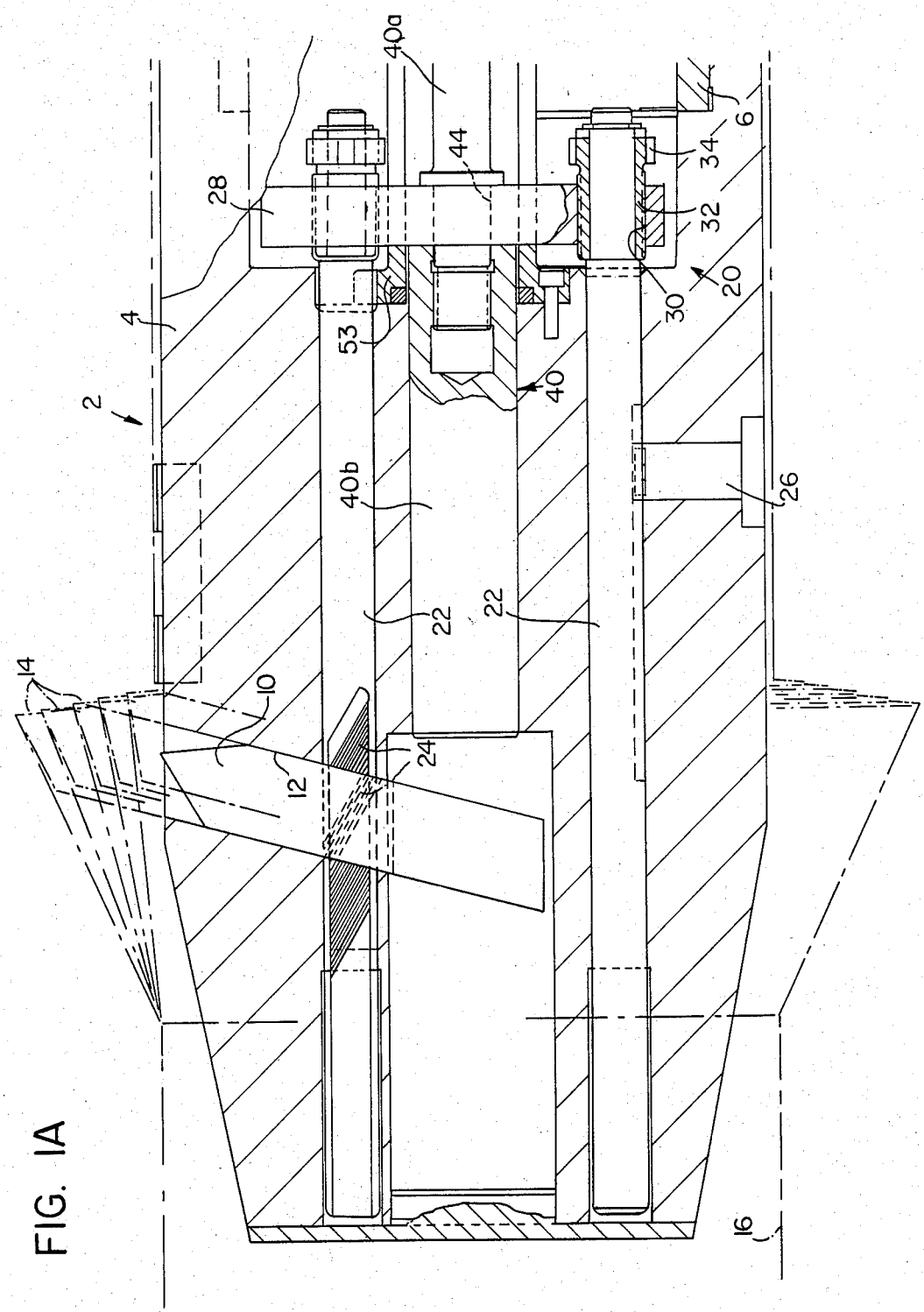
FIGS. 1A,1B are a longitudinal section of a bore head including cluding an automatically engageable and disengageable coupling.
Figure 1B:
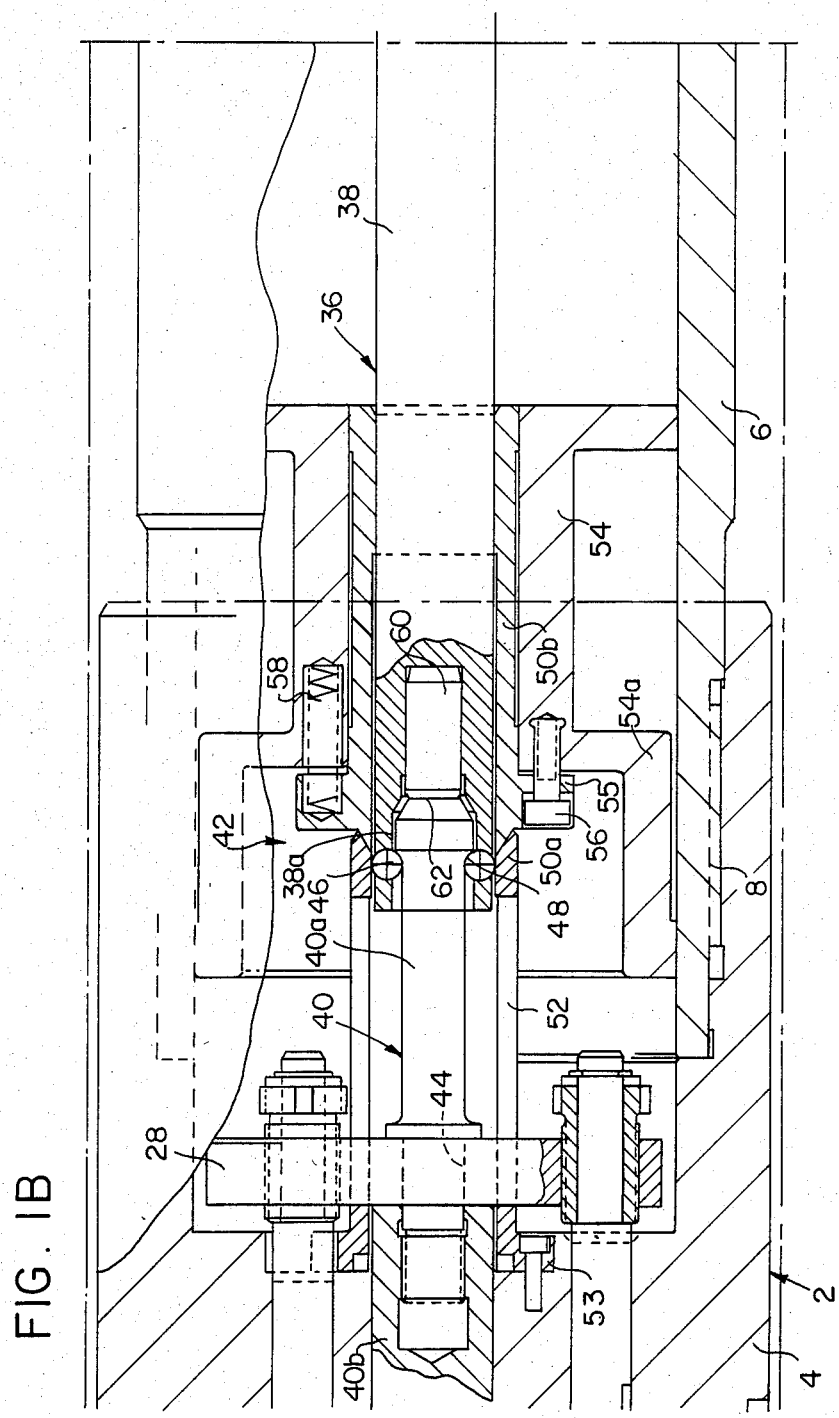

Bore head 2 shown in FIGS. 1A,1B comprises a base member 4 having a sleeve-shaped portion, to which a rotating boring tube 6 is secured by a threaded connection 8. Bore head 2 is provided with a plurality of circumferentially spaced cuting members 10; in the present embodiment the number of the cutting members 10 is five (see also FIG. 2).

Cutting members 10 are adjustable, i.e. displaceable transverse to the axis of the boring tube, and to this end they are slidingly supported in guiding holes 12 of base member 4. Guiding holes 12 extend generally in a radial direction, however are slightly inclined with respect to a radial plane, as shown in FIG. 1A.

Cutting members 10 are provided with cutting edges 14 for boring a workpiece 16 (indicated in dash-dotted lines) as will be explained in more detail.

For adjusting cutting members 10 there is provided an actuating device 20. Actuating device 20 comprises five actuating rods 22 which are supported for axial movement in circumferentially spaced bores of base member 4, which bores extend parallel to the axis of the bore head. Each of the actuating rods 22 coacts with its associated cutting member 10 by force and motion transmitting means 24 comprised of inclined teeth provided on adjacent sides of actuating rods 22 and cutting member 10 (see FIG. 2). In order to ensure proper engagement of teeth 24, actuating rods 22 are prevented from rotational movement by key members 26.

Actuating rods 22 are connected to a common connecting member 28 at their ends remote from cutting members 10. To this end disc-shaped connecting member 28 is provided with circumferentially spaced bores 30 wherein actuating rods 22 are held by threaded sleeves 32. Threaded sleeves 32 each are provided with a threaded head 34 to allow for fine adjustment of actuating rods 22 and accordingly cuting edges 14 of cutting members 10 by means of a suited tool (not shown).

A central actuating bar 36 is provided for axially displacing connecting member 28 and actuating rods 22, which actuating bar 36 is comprised of a bar portion 38 connected to a drive motor (not shown) and a bar portion 40 connected to the connecting member 28. Bar portions 38 and 40 may be connected to and separated from each other by a coupling 42 automatically engageable and disengageable when bore head 2 is being interchanged.

Rod portion 40 comprises a coupling rod 40a and a guide rod 40b; coupling rod 40a extends through a central bore 44 of connecting member 28 and is in threaded engagement with guide rod 40b. In this manner connecting member 28 is clamped between coupling rod 40a and guide rod 40b. Guide rod 40b is supported for axial displacement in a central bore of base member 4.

Coupling 42 further comprises a coupling sleeve 38a integral with bar portion 38 and provided with circumferentially spaced through-holes for receiving radially displaceable balls 46. Balls 46 are supported on the outer periphery of coupling rod 40a when the coupling is in its engaged position, and they abut a ramp-like shoulder 48 of the coupling rod 40a.

When the coupling 42 is in its engaged condition balls 46 are prevented from a radially outward movement by an outer sleeve formed by a pair of sleeve portions 50a, 50b. Sleeve portion 50a is fixed to base member 4 by axially extending and circumferentially spaced arms 52 which extend through aligned through-holes of connecting member 28 to an annular portion 53 connected to base member 4 by bolts.

Sleeve portion 50b is supported in a sleeve-like member 54 with limited axial play, which sleeve-like member 54 is connected to the boring tube 6 by a cup-shaped portion 54a. For limiting the axial play of sleeve portion 50b there are provided bolts 56 extending through a flange of sleeve portion 50b and being in threaded engagement with sleeve-like member 54. Between flange 55 and sleeve-like member 54 there are provided helical springs 58 urging sleeve portion 50 into abutment with sleeve portion 50a. Sleeve portions 50a, 50b are provided with conical abutment surfaces which, when the coupling 42 is in its engaged condition, engage each other such that sleeve portions 50a, 50b form at their inner peripheries a continuous abutment surface for balls 46, as shown in FIG. 1B.

A pin-shaped member 60 is disposed within coupling sleeve 38a and has an abutment surface 62 engaged by the free end of coupling rod 40a.

The operation of the bore head is as follows.

If actuating bar 36, connecting member 28 and actuating rods 22 are in their left-hand end positions (with reference to FIGS. 1A,1B), the cutting members 10 are in their innermost positions and do not extend beyond the outer periphery of bore head 2. Boring tube 6 including bore head 2 may now be moved into the bore of workpiece 16 with rapid advance. Thereafter cutting members 10 are displaced to their work positions. During the following work stroke which is from left to right (with reference to Fig. 1A), cutting members 10 are radially outwardly displaced according to the bore contour to be machined so that cuting edges 14 will be in the positions indicated by dashdotted lines in FIG. 1A. Bore head 2 performs a "traction movement" during this cutting operation.

Figure 2:
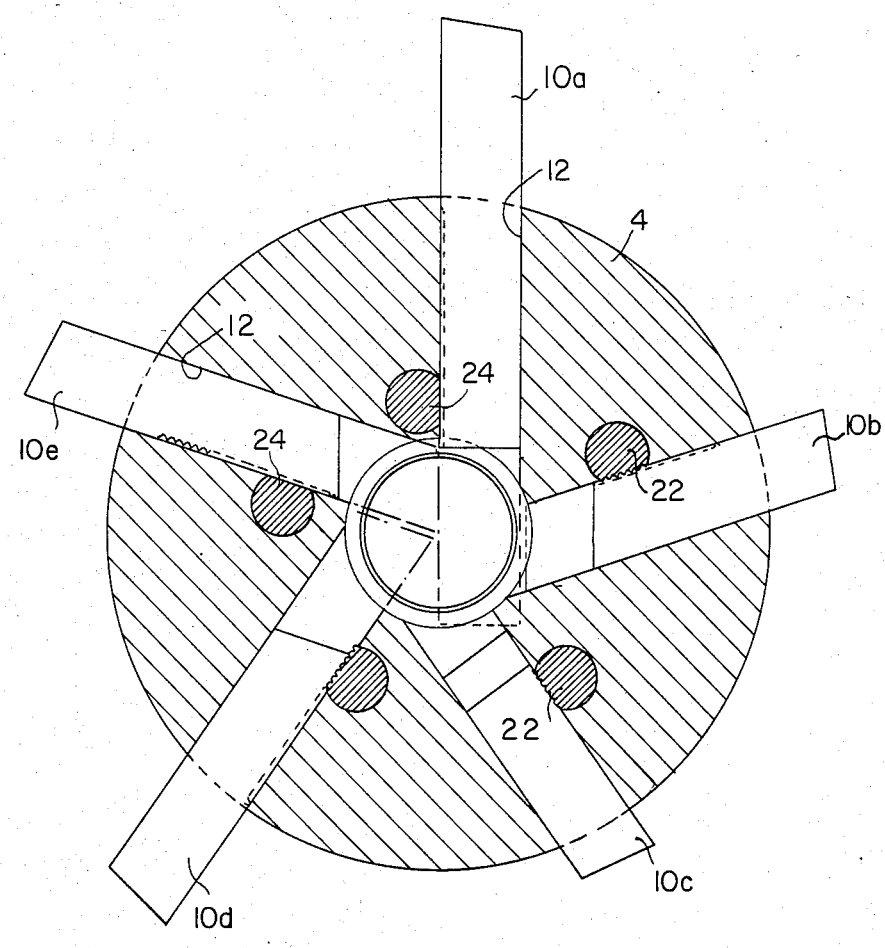
FIG. 2 is a cross-section of the bore head at the area of the cutting members.

As shown in FIG. 2 cutting members 10 are radially displaced to different extents. This is a result of inclined teeth 24 for the five cutting members 10a, 10b, 10c, 10d, 10e providing for different transmission ratios when transforming the axial movement of actuating rods 22 into a radial movement of cutting members 10. As may be seen in FIG. 1, the adjusting stroke of cutting member 10a is the maximum stroke while that of cutting member 10c is the minimum stroke. The adjusting stroke and the length of cutting member 10a are chosen such that the radially innermost end of cutting member 10a extends beyond the central axis of base member 4 when in its innermost position. The innermost position of adjacent cutting members 10b and 10e are confined by side faces of cutting member 10a. Also the innermost position of the cutting member 10c is defined by the position of cutting member 10a, while the inward stroke of cutting member 10d is limited by a side face of cutting member 10e. In short the cutting members must be arranged with a view to their adjusting strokes such that they do not interfer within the central bore of base member 4.

At the end of the cutting operation cutting members 10 are again retracted. To this end actuating bar 36 and accordingly actuating rods 22 are displaced to the left (with reference to FIGS. 1A,1B) with this axial movement again being transformed into radial movement of cutting members 10 by inclined teeth 24. When cutting members 10 have been retracted, bore head 2 may be withdrawn from the bore of workpiece 16 with rapid return movement.

When actuating bar 36 is moved to the right by the drive motor (not shown) and accordingly is subjected to traction forces to radially extend cutting members 10, the forces are transmitted in coupling 12 by bar portion 38 including coupling sleeve 38a, balls 46, shoulder 48 and coupling rod 40a wherefrom the forces are transmitted to actuating rods 22 via connecting member 28. During such displacement of actuating bar 36, balls 46 are held in engagement with shoulder 48 by sleeve portions 50a, 50b.

When the actuating bar 36 is displaced to the left by the drive motor and accordingly is subjected to pressure forces in order to radially extend cutting members 10, the forces are transmitted in coupling 42 by bar portion 38, abutment member 60 including its abutment 62 to coupling rod 40a. In such case balls 46 do not transmit any forces even though they are held in abutment with shoulder 48 by sleeve portions 50a, 50b that are held stationary by bore head 2 and boring tube 6 during such movement.

If bore head 2 is to be replaced, it is disengaged from boring tube 6 by a rotational movement. While bore head 2 moves away from boring tube 6 in an axial direction, sleeve portion 50a fixed to base member 4 is moved together with bore head 2. However, coupling rod 40a together with connecting member 28, actuating rods 22 and cutting members 10 are prevented from a corresponding movement by balls 46 which initially are held in their radially inner positions by sleeve portion 50a. When sleeve portion 50a has moved away from sleeve portion 50b sufficiently to come out of engagement with balls 46, balls 46 will be moved radially outwards by ramp-shaped shoulder 48 of coupling rod 40a so that coupling rod 40a may now be withdrawn from coupling sleeve 38a to be separated from bar portion 38.

Bore head 2 including sleeve 50a and coupling rod 40a may now be fully withdrawn from boring tube 6. So coupling 42 is automatically released by withdrawing bore head 2 from boring tube 6, no additional measures being required.

In a similar way coupling 42 is automatically engaged when bore head 2 is connected to boring tube 6 by a screwing movement. During such operation coupling rod 40a is inserted into the bore of coupling sleeve 38a far enough to abut abutment surface 62 of abutment member 60. During screwing movement of bore head with respect to boring tube 6, sleeve portion 50a is telescoped over the outer periphery of coupling sleeve 38a and balls 46 until sleeve portion 50a has its conical end abut the matingly conical end of sleeve portion 50b. Since sleeve portion 50b is arranged to have anaxial play and is resiliently biased towards sleeve-like member 54, a proper abutment of sleeve portions 50a, 50b is ensured despite of any manufacturing tolerances of threaded connection 8.

I claim:

1. An improvement in a bore head for deep boring of the type comprising a plurality of circumferentially spaced cutting members adjustable transverse to the bore head axis, and an actuating device actuatable by a drive motor for adjusting the cutting members, the improvement wherein said actuating device comprises a plurality of actuating rods positioned parallel to each other, each actuating rod being operably associated with a respective cutting member, a plurality of force transmitting means, each force transmitting means being adapted for actuating and displacing a respective actuating rod in a direction parallel to said bore head axis whereby respective cutting members are actuated, each of said force transmitting means includes a gear means having inclined teeth provided at the sides of said associated cutting member, each actuating rod being displaceable in a direction parallel to the bore head axis for acting on a respective associated cutting member by a respective force transmitting means, said actuating rods being secured against rotation and connected to a central actuating bar having a common connecting member, said connecting member comprises a disc disposed in a radial plane, said disc beign provided with a central opening for receiving a part of the actuating bar and having a plurality of circumferentially spaced openings for receiving the actuating rods said central actuating bar beign axially displaceable by a drive motor for actuating said cutting members.

* * * * *